United States Patent
Henry

(10) Patent No.: US 10,687,082 B2
(45) Date of Patent: Jun. 16, 2020

(54) METHOD FOR ENCODING A DIGITAL IMAGE, DECODING METHOD, DEVICES, USER TERMINAL AND ASSOCIATED COMPUTER PROGRAMS

(71) Applicants: B<>COM, Cesson Sevigne (FR); ORANGE, Paris (FR)

(72) Inventor: Felix Henry, Saint Gregoire (FR)

(73) Assignee: B<>COM, Paris (FR)

( * ) Notice: Subject to any disclaimer, the term of this patent is extended or adjusted under 35 U.S.C. 154(b) by 63 days.

(21) Appl. No.: 16/066,966

(22) PCT Filed: Dec. 16, 2016

(86) PCT No.: PCT/FR2016/053540
§ 371 (c)(1),
(2) Date: Jun. 28, 2018

(87) PCT Pub. No.: WO2017/115028
PCT Pub. Date: Jul. 6, 2017

(65) Prior Publication Data
US 2019/0007706 A1    Jan. 3, 2019

(30) Foreign Application Priority Data

Dec. 29, 2015 (FR) ...................................... 15 02721

(51) Int. Cl.
*H04N 19/64* (2014.01)
*H04N 19/39* (2014.01)
(Continued)

(52) U.S. Cl.
CPC ......... *H04N 19/647* (2014.11); *H04N 19/119* (2014.11); *H04N 19/13* (2014.11);
(Continued)

(58) Field of Classification Search
None
See application file for complete search history.

(56) References Cited

U.S. PATENT DOCUMENTS 9,729,880 B2 *  8/2017  Yokose ................... H04N 19/61
9,813,716 B2 * 11/2017  Miyoshi ............... H04N 19/176
(Continued)

OTHER PUBLICATIONS

IP.com search report.*
(Continued)

*Primary Examiner* — Mohammad J Rahman
(74) *Attorney, Agent, or Firm* — David D. Brush; Westman, Champlin & Koehler, P.A.

(57) ABSTRACT

A method for encoding a digital image divided into a plurality of blocks of pixels. The method includes, for a current block: processing the current block to provide a set of description elements; selecting a subset of description elements to be predicted; ordering the description elements of the subset into an ordered sequence; and encoding the elements of the sequence. Encoding includes scrolling the elements of the sequence and includes, for a current element: selecting a combination of predicted values of the description elements of the current sequence from a plurality of possible combinations based on a predetermined cost criterion and from the second element, values of description elements previously processed of the initial sequence; predicting the current element of the sequence by its value in the selected combination; and encoding an indicator representative of a difference between the actual value of the current element and its predicted value.

16 Claims, 5 Drawing Sheets

(51) Int. Cl.
   *H04N 19/192* (2014.01)
   *H04N 19/119* (2014.01)
   *H04N 19/61* (2014.01)
   *H04N 19/176* (2014.01)
   *H04N 19/13* (2014.01)
   *H04N 19/91* (2014.01)
   *H04N 19/50* (2014.01)
   *H04N 19/18* (2014.01)
   *H04N 19/136* (2014.01)
   *H04N 19/46* (2014.01)

(52) U.S. Cl.
   CPC ......... *H04N 19/136* (2014.11); *H04N 19/176* (2014.11); *H04N 19/18* (2014.11); *H04N 19/192* (2014.11); *H04N 19/39* (2014.11); *H04N 19/50* (2014.11); *H04N 19/619* (2014.11); *H04N 19/91* (2014.11); *H04N 19/46* (2014.11)

(56) References Cited

U.S. PATENT DOCUMENTS

| | | | | |
|---|---|---|---|---|
| 10,171,811 B2* | 1/2019 | Kim | ........................ | H04N 19/58 |
| 2011/0200098 A1* | 8/2011 | Kim | ...................... | H04N 19/567 |
| | | | | 375/240.02 |
| 2011/0222602 A1* | 9/2011 | Sung | .................... | H04N 21/235 |
| | | | | 375/240.12 |
| 2013/0044808 A1 | 2/2013 | Nakagawa et al. | | |
| 2013/0114742 A1* | 5/2013 | Hannuksela | ........... | H04N 19/58 |
| | | | | 375/240.25 |
| 2014/0192165 A1* | 7/2014 | Norkin | ................. | H04N 19/463 |
| | | | | 348/47 |
| 2015/0156486 A1* | 6/2015 | Miyoshi | ............... | H04N 19/176 |
| | | | | 375/240.02 |
| 2015/0195555 A1* | 7/2015 | Hendry | ................... | H04N 19/46 |
| | | | | 375/240.16 |
| 2015/0281687 A1* | 10/2015 | Yasugi | ................. | H04N 19/159 |
| | | | | 382/166 |
| 2016/0088301 A1* | 3/2016 | Yokose | ................... | H04N 19/61 |
| | | | | 382/238 |
| 2016/0127725 A1* | 5/2016 | Jamali | ................... | H04N 19/103 |
| | | | | 375/240.12 |
| 2016/0173887 A1* | 6/2016 | Deshpande | ........... | H04N 19/433 |
| | | | | 375/240.08 |
| 2017/0006289 A1* | 1/2017 | Alshina | ................ | H04N 19/124 |
| 2017/0272782 A1* | 9/2017 | Li | ........................... | H04N 19/96 |
| 2017/0302961 A1* | 10/2017 | Ikai | ....................... | H04N 19/597 |

OTHER PUBLICATIONS

Search report IP.com.*
International Search Report dated Apr. 10, 2017, for corresponding International Application No. PCT/FR2016/053540, filed Dec. 16, 2016.
Written Opinion of the International Searching Authority dated Apr. 10, 2017, for corresponding International Application No. PCT/FR2016/053540, filed Dec. 16, 2016.
French Search Report and Written Opinion dated Jul. 22, 2016 for corresponding French Application No. 1502721, filed Dec. 29, 2015.
English translation of the Written Opinion of the International Searching Authority dated Apr. 10, 2017, for corresponding International Application No. PCT/FR2016/053540, filed Dec. 16, 2016.
Koyama J. et al., "Coefficient sign bit compression in video coding", 2012 Picture Coding Symposium (PCS 2012): Krakow, Poland, May 7-9, 2012; [Proceedings], IEEE, Piscataway, NJ, May 7, 2012 (May 7, 2012), pp. 385-388, XP032449909.

* cited by examiner

METHOD FOR ENCODING A DIGITAL IMAGE, DECODING METHOD, DEVICES, USER TERMINAL AND ASSOCIATED COMPUTER PROGRAMS

1. CROSS-REFERENCE TO RELATED APPLICATIONS

This Application is a Section 371 National Stage Application of International Application No. PCT/FR2016/053540, filed Dec. 16, 2016, the content of which is incorporated herein by reference in its entirety, and published as WO 2017/115028 on Jul. 6, 2017, not in English.

2. FIELD OF THE INVENTION

The field of the invention is that of signal compression, in particular of a digital image or of a sequence of digital images, in which a prediction of a portion of the signal to be coded is made from a portion of the already encoded signal.

The encoding/decoding of digital images applies in particular to images from at least one video sequence comprising:
  images from the same camera and succeeding each other temporally (type-2D encoding/decoding),
  images from different cameras oriented according to different views (3D-type encoding/decoding),
  components of corresponding texture and depth (3D-type encoding/decoding),
  etc.

The present invention applies in a similar manner to the 2D- or 3D-type encoding/decoding of images.

The invention may especially, but not exclusively, apply to the video encoding implemented in the current AVC and HEVC video encoders and their extensions (MVC, 3D-AVC, MV-HEVC, 3D-HEVC, etc.) and to corresponding decoding.

The invention can also be applied to audio encoding, for example implemented in current audio encoders (EVS, OPUS, MPEG-H, etc.) and their extensions and to the corresponding decoding.

3. DESCRIPTION OF THE PRIOR ART

A conventional compression scheme of a digital image is considered, in which the image is divided into blocks of pixels. A current block to be encoded is predicted from a previously encoded decoded block. A residue block is obtained by subtracting the original values from the predicted values. It is then transformed using a DCT (Discrete Cosine Transform) or wavelet transform. The transformed coefficients are quantised and then their amplitudes are subjected to an entropy coding of the Huffmann or arithmetic type. Such encoding obtains efficient performances because, due to the transformation, the values of the amplitudes to be encoded are largely zero.

However, it does not apply to the values of the signs of the coefficients of which the values + and − are usually associated with equivalent probabilities of occurrence. Thus, the signs of the coefficients are encoded by a bit 0 or 1.

We know from the article by Koyama, J. et al, entitled "Coefficient sign bit compression in video coding," and published in the proceedings of the conference "Picture Coding Symposium (PCS)", in May 2012, a method for selecting signs of coefficients of a residue block to be predicted. The proposed selection is based on a predetermined number of coefficients as a function of their amplitude and the size of the block from which they are derived. The selected signs are predicted by testing all possible combinations of the values of these signs for the block and choosing the one that maximises a predetermined likelihood criterion. The predictions obtained are compared with the original values of the signs to determine the value of a prediction indicator, also called the residue of a predicted sign. This indicator can take two values, which are a first value representative of a correct prediction and a second value representative of an incorrect prediction. The rest of the signs are encoded explicitly, without prediction.

An advantage of such a selection is to predict the value of a sign with a correct prediction probability greater than 50%, thus to allow the application of entropic encoding to the values of the prediction indicators. This entropic encoding encodes the sign information with an average bit rate of less than one bit per sign, thereby increasing the compression ratio.

4. DISADVANTAGES OF THE PRIOR ART

A disadvantage of this technique is that by predicting globally all the selected signs, each sign is influenced by the value of others, and the prediction is degraded.

5. SUMMARY OF THE INVENTION

An exemplary embodiment of the present disclosure relates to a method for encoding of a digital image, said image being divided into a plurality of blocks of pixels processed in a set order, said method comprising the following steps, implemented for a current block:
  Processing the current block to provide a set of description elements of the processed block;
  Selecting a subset of at least two description elements to be predicted from the provided set;
  Ordering the description elements of the subset into an ordered sequence;
  Encoding the elements of the sequence.

According to the invention, the step of encoding the elements of the sequence comprises scrolling the elements of the sequence and comprises, for a current element, the following substeps:
  Selecting a combination of predicted values of description elements of the sequence among a plurality of combinations according to a predetermined cost criterion and, from the second element, actual values of description elements previously scrolled in the sequence;
  Predicting the current element of the sequence by its value in the selected combination; and
  Encoding an indicator representative of a difference between the actual value of the current element and its predicted value.

The invention is based on an entirely new and inventive approach which consists of ordering the description elements to be predicted according to an associated score and predicting each element of the sequence based on the best combination of predicting the values of the elements of the ordered sequence, according to a predetermined cost criterion. Thus, unlike in the prior art, the current element benefits from an individualised treatment that exploits the knowledge of the actual values of the elements already processed, which makes it possible to improve the prediction quality of the elements as and when the sequence is being processed and thus increase the compression efficiency.

According to another aspect of the invention, the step of ordering generates an initial sequence, the step of encoding takes as a current element the first element of a current sequence initialised at the initial sequence and comprises, once the first current element has been processed, a substep of updating the current sequence by deleting the first element.

An advantage of this implementation is to free up memory as the sequence of prediction elements is being processed.

According to another aspect of the invention, the method comprises a preliminary step of calculating the costs associated with the plurality of combinations of values of the initial sequence, a step of storing the plurality of combinations and their associated costs, and the selection step comprises selecting, for the current element, a combination of values of the initial sequence for which the previously processed elements have their actual values.

One advantage of this solution is to be very efficient in computing resources. The combinations and their associated costs are calculated and stored once and for all.

According to another aspect of the invention, the step of selecting comprises a sub-step for calculating the costs associated with the possible combinations of values of the current sequence as a function of a cost criterion which depends on the actual values of the elements previously scrolled.

An advantage of this solution is that it is economical in memory resources, the calculation of the combinations and their associated costs being implemented on the fly for each current sequence.

According to another aspect of the invention, the step of selecting comprises selecting a subset of description elements to be predicted based on predetermined scores, a predetermined score being representative of a reliability level of the prediction element with which it is associated, and the step of ordering orders the elements to be predicted according to said scores.

One advantage is that the score being indicative of a level of reliability or a faculty of an item to be well predicted, the subset includes only the best candidates for prediction.

According to yet another aspect of the invention, the predetermined cost criterion belongs to a group comprising at least:
  a criterion for minimising a distortion along a border of the current block with a previously processed block;
  a proximity criterion with a predetermined value;
  a criterion for minimising an energy measurement of a difference between the current block and a prediction of the current block.

One advantage is that the invention makes it possible to use alternatively several cost criteria and possibly a combination of these criteria.

The method which has just been described in its different embodiments is advantageously implemented by a device for encoding a digital image, said image being divided into a plurality of blocks of pixels processed in a set order, said device comprising a reprogrammable computing machine or a dedicated computing machine, able to and configured for:
  Processing the current block and providing a set of description elements of the processed block;
  Selecting a subset of at least two description elements to be predicted from the provided set of description elements of the current block;
  Ordering the description elements of the subset into an ordered sequence;
  Encoding the elements of the ordered sequence.

According to the invention, the encoding of the elements of the sequence comprises scrolling elements of the sequence and, for a current element, is able to and configured for:
  Selecting a combination of predicted values of description elements of the sequence among a plurality of combinations according to a predetermined cost criterion and, from the second element, actual values of description elements previously scrolled in the sequence;
  Predicting the current element of the sequence by its value in the selected combination; and
  Encoding an indicator representative of a difference between the actual value of the current element and its predicted value.

Correlatively, the invention also relates to a method for decoding a digital image from a bit stream, said image being divided into a plurality of blocks processed in a set order, the bit stream comprising encoded data representative of elements description of the blocks of the image, said method comprising the following steps, implemented for a block, so-called current block:
  Identifying a set of description elements of the current block from bitstream data;
  Selecting a subset of at least two description elements to be predicted from the identified set;
  Ordering the description elements of the subset into an ordered sequence;
  Decoding the elements of the ordered sequence.

According to the invention, said method is particular in that the step of decoding the elements of the sequence comprises scrolling said elements and comprises, for a current element, the following substeps:
  Selecting a combination of predicted values of description elements of the sequence among a plurality of combinations according to a predetermined cost criterion and, from the second element, decoded values of description elements previously scrolled in the sequence;
  Predicting the first element of the sequence by its value in the selected combination;
  Decoding an indicator representative of a difference between the decoded value of the current element and the predicted value, based on encoded data extracted from the bitstream, and
  Obtaining the decoded value of the current element from the decoded indicator and the predicted value.

An advantage of the invention is that it makes it possible to maintain independence between the reading/parsing of encoded data contained in the bitstream and the processing/exploitation of these data to decode the current block.

According to another aspect of the invention, the step of ordering generates an initial sequence, the step of decoding takes as a current element the first element of a current sequence initialised at the initial sequence and comprises, once the first current element has been decoded, a substep of updating the current sequence by deleting the first element.

As with encoding, this embodiment has the advantage of limiting the storage of calculated data and to free up memory as the processing progresses.

According to yet another aspect of the invention, the decoding method comprises a preliminary step of calculating the costs associated with the plurality of combinations of values of the initial sequence, a step of recording the plurality of combinations and their associated costs and the step of selecting comprises selecting a combination from the recorded combinations that start with the decoded values of the previously scrolled items in the scrolling order.

As with encoding, this embodiment is advantageously economical in computing resources. The combinations and their associated costs are calculated and stored once and for all.

According to yet another aspect of the invention, the step of selecting comprises a substep for calculating the costs associated with the possible combinations of values of the current sequence as a function of a cost criterion which depends on the decoded values of the elements previously scrolled.

As with encoding, an advantage of this solution is that it is economical in memory resources, the calculation of the combinations and their associated costs being implemented on the fly for each current sequence.

The method that has just been described in its various embodiments is advantageously implemented by a device for decoding a digital image from a bit stream comprising encoded data representative of said image, said image being divided into a plurality of blocks processed in a set order, the bitstream comprising encoded data representative of description elements of the blocks of the image, said device comprising a reprogrammable computing machine or a dedicated computing machine, configured for and able to, for a block, so-called current block:

Identifying a set of description elements of the current block from bitstream data;
Selecting a subset of at least two description elements to be predicted from the identified set;
Ordering the description elements of the subset into an ordered sequence;
Decoding the elements of the ordered sequence.

According to the invention, the decoding of the elements of the initial sequence comprises at least two iterations of the following units, configured for and able to be applied to a so-called current sequence, initialised at the initial sequence:

Selecting (SEL $Cb_k$) a combination of predicted values of the description elements of the current sequence among a plurality of possible combinations based on a predetermined cost criterion and from the second element, values of description elements previously decoded of the initial sequence;
Predicting (PRED) the first element of the sequence by its value in the selected combination;
Decoding (DEC IP) an indicator representative of a difference between the decoded value of the current element and the predicted value, based on encoded data extracted from the bitstream, and
Obtaining (GET) the decoded value of the current element from the decoded indicator and the predicted value.

Correlatively, the invention also relates to a signal carrying a bitstream comprising encoded data representative of description elements of blocks of pixels of a digital image, said blocks of pixels being processed in a set order.

The signal according to the invention is particularly in that said data encoded in the bitstream are obtained according to the method for encoding a digital image according to the invention.

Correlatively, the invention also relates to a user terminal comprising a device for encoding a digital image and a device for decoding a digital image according to the invention.

The invention also relates to a computer program comprising instructions for implementing the steps of a method for encoding a digital image as described above, when this program is executed by a processor.

The invention also relates to a computer program comprising instructions for implementing the steps of a method for decoding a digital image as described above, when this program is executed by a processor.

These programs can use any programming language. They can be downloaded from a communication network and/or recorded on a computer-readable medium.

Finally, the invention relates to recording media, readable by a processor, integrated or not integrated with the device for encoding a digital image and with the device for decoding a digital image according to the invention, which is optionally removable, thereby storing respectively a computer program implementing a method for encoding a digital image and a computer program implementing a method for decoding a digital image, as described above.

6. LIST OF FIGURES

Other features and advantages of the invention will become evident on reading the following description of one particular embodiment of the invention, given by way of illustrative and non-limiting example only, and with the appended drawings among which:

FIG. 1 schematically illustrates a sequence of digital images to be encoded and the division into blocks of these images according to the prior art;

FIG. 2 shows schematically the steps of a method for encoding a digital image according to the invention;

FIG. 3 details the step of processing a block implemented in the method of encoding according to the invention;

7. DESCRIPTION OF A PARTICULAR EMBODIMENT OF THE INVENTION

The general principle of the invention rests on an individual and successive processing of description elements of an ordered sequence of description elements to be predicted. For an element of this sequence, the invention selects the best combination of values of the ordered sequence according to a predetermined cost criterion and as a function of the actual/decoded values of the elements already processed and on the prediction of the current element of this sequence by its value in this combination.

Figure 1:
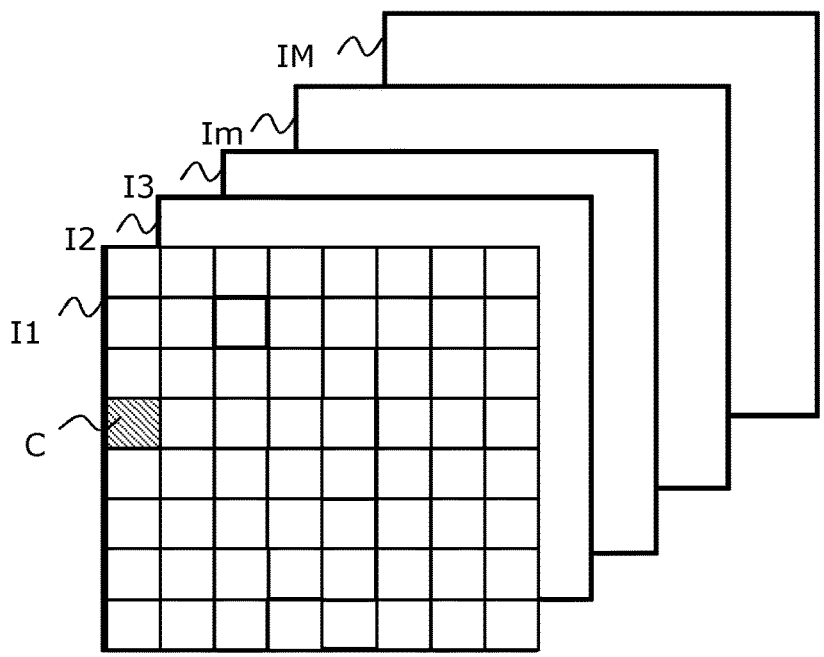

In relation to FIG. 1, an original video is considered, consisting of a sequence of M images I1, I2, . . . IM with M a non-zero integer. The images are encoded by an encoder, the encoded data are inserted in a bitstream TB transmitted to a decoder via a communication network, or a compressed file FC, intended to be stored on a hard disk for example. The decoder extracts the data which are encoded, then received and decoded by a decoder in a predefined order known from the encoder and the decoder, for example in the time order I1, then I2, . . . , then IM, whereas this order may differ according to the embodiment.

When encoding an image Im, where m is an integer between 1 and M, it is subdivided into blocks of maximum size which in turn can be subdivided into smaller blocks. Each block C will undergo an encoding or decoding operation consisting of a sequence of operations, including in a non-exhaustive manner a prediction, a calculation of a residue of the current block, a transformation of the pixels of the current block into coefficients, a quantification of the coefficients and an entropic encoding of the quantised coefficients. This sequence of operations will be described in detail below.

The steps of the method for encoding an image $I_m$ according to the invention will now be described in relation with FIG. 2.

In E0, the first block to be processed is selected as the current block C. For example, this is the first block (in lexicographic order). This block comprises N×N pixels.

During a step $E_1$, a current block C is processed by implementing an encoding scheme, for example as specified in the HEVC standard, in the document "ISO/IEC 23008-2:2013—High efficiency coding and media delivery in heterogeneous environments—Part 2: High efficiency video coding», International Organization for Standardization, published in Nov. 2013.

This processing step is intended to provide a set of elements E for describing the data to be encoded for the current block C. These description elements may be of various types. Non-exhaustively, they include in particular:
  the information relating to encoding choices of the current block C, for example an encoding mode of the current block, such as the INTRA, INTER or SKIP mode, a prediction mode of the current block, among the prediction modes of an INTRA block, a prediction mode of a motion vector estimated for the current block, or still the significance of an amplitude of a coefficient, known per se in HEVC;
  the data values to be encoded, such as the components of a motion vector, the amplitude or the sign of a coefficient;
  etc.

It is assumed that there exist L cuts in possible blocks numbered from 1 to L, and that the cut used on block C is the cut number 1. For example, there can be 4 possible cuts, in blocks of size 4×4, 8×8, 16×16 and 32×32.

Figure 4:
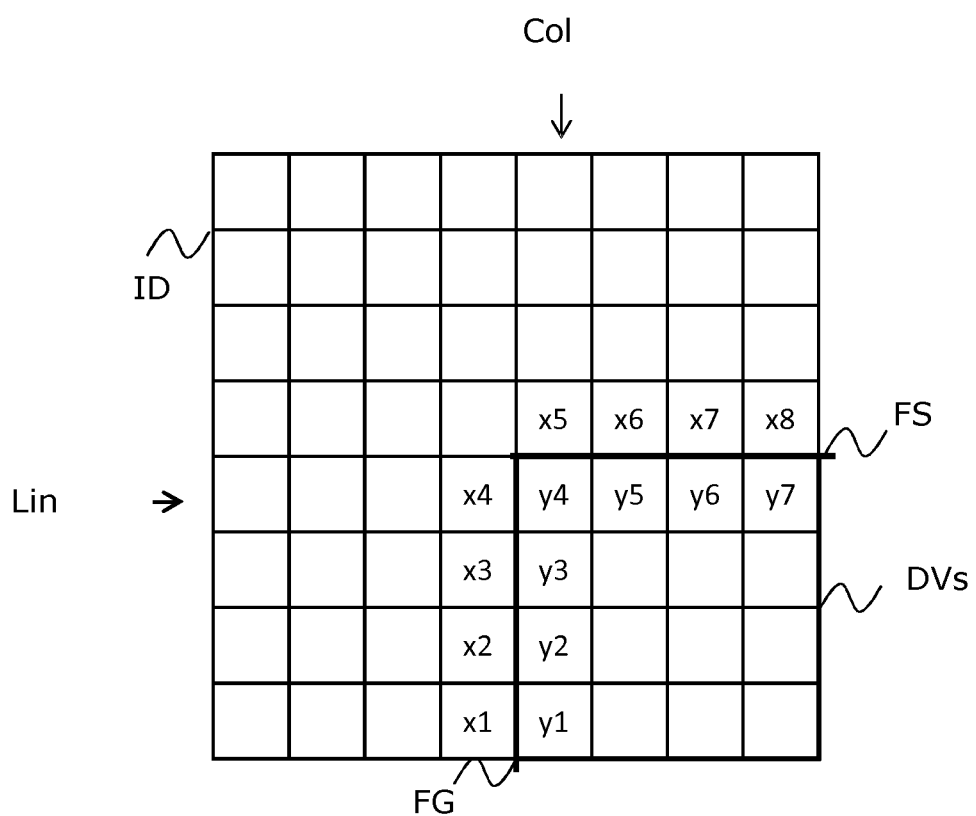
FIG. 4 shows schematically a decoded current block of a decoded digital image.

In relation to FIG. 4, the decoded current picture is designated by ID. It will be noted that, in a video encoder, the ID image is (re)constructed in the encoder so that it can be used to predict the other pixels of the image sequence.

Figure 3:
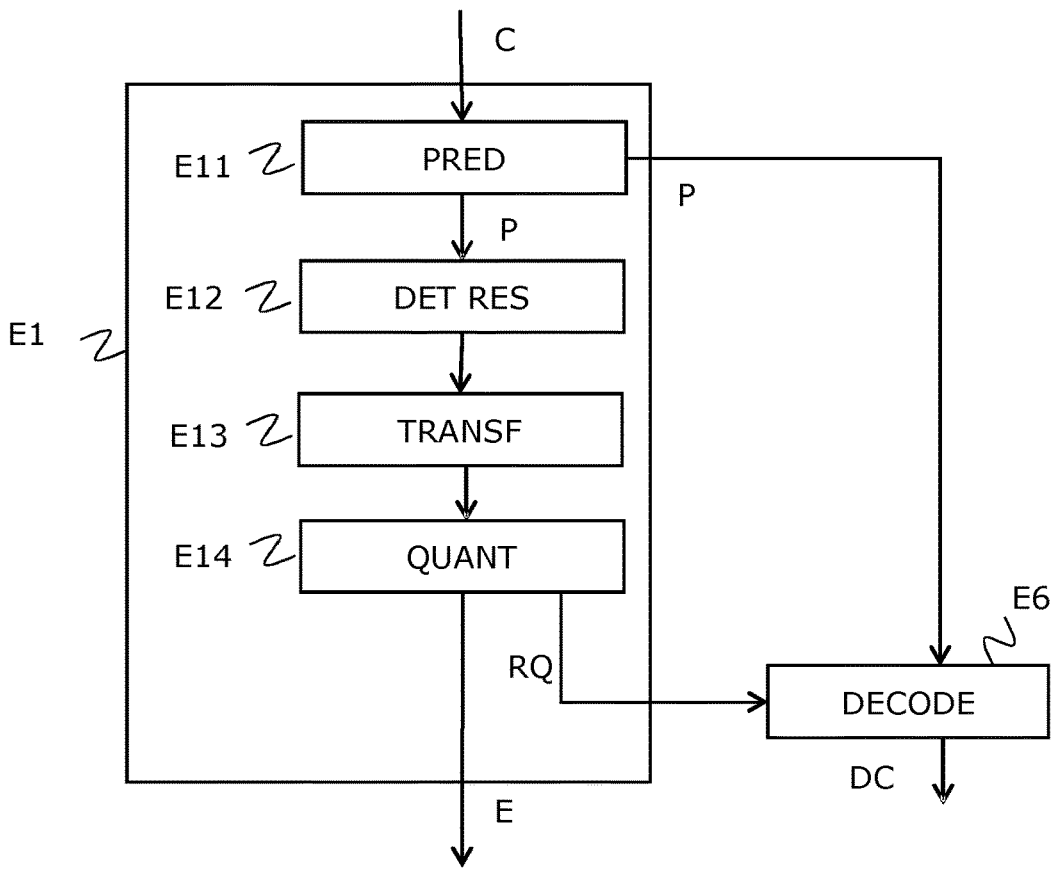

In relation with FIG. 3, an example of substeps implemented by this processing $E_1$ of the current block C selected, in accordance with the HEVC standard, is detailed.

During a step E11, a prediction P of the original block C is determined. It is a prediction block constructed by known means, typically by motion compensation (a block originating from a previously decoded reference image) in the case of a so-called INTER prediction or by INTRA prediction (a block constructed from the decoded pixels immediately adjacent to the current block in the ID image). The prediction information related to P is encoded in the bitstream TB or compressed file FC. It is assumed here that there are K possible prediction modes $M_1, M_2, \ldots, M_K$, with K non-zero integer, and that the prediction mode chosen for block C is the mode Mk.

During a step $E1_2$, an original residue R is formed by subtraction of R=C−P from the prediction P of the current block C in the current block C.

During a step $E1_3$, the residue R is transformed into a transformed residue block, called RT, by a transform of the DCT type or transformed into wavelets, both known to those skilled in the art and in particular implemented in the JPEG standards for DCT and JPEG2000 for wavelet transform.

At $E1_4$, the transformed residue RT is quantised by conventional quantification means, for example scalar or vector, into a quantised residue block RQ. This quantised block RQ contains N×N coefficients. In a manner known in the state of the art, these coefficients are scanned in a predetermined order so as to constitute a monodimensional vector RQ[i], where the index i varies from 0 to $N^2-1$. The index i is called the frequency of the coefficient RQ[i]. Conventionally, these coefficients are scanned in ascending order of frequency, for example according to a zigzag path, which is known from the JPEG fixed image encoding standard.

During a step $E1_5$, the amplitude information of the coefficients of the residue block RQ is encoded by entropic coding, for example according to a Huffman encoding technique or an arithmetic encoding technique. By amplitude herein is meant the absolute value of the coefficient. Encoding means of the amplitudes are described for example in the HEVC standard and in the article by Sole et al, entitled "Transform Coding Coefficient in HEVC" published in the IEEE Transactions on Circuits and Systems for Video Technology, Volume 22, Issue: 12, pp. 1765-1777, in Dec. 2012. Conventionally, it is possible to encode for each coefficient information representative of the fact that the coefficient is non-zero. Then, for each non-zero coefficient, one or more pieces of information relating to the amplitude are encoded. The encoded amplitudes CA are obtained.

At the end of the step E1, there is therefore for the current block C a set E of description elements of data to be encoded, among which are the quantised transformed residue coefficients RQ[i], the signs of these coefficients, the prediction mode Mk etc.

Figure 2:
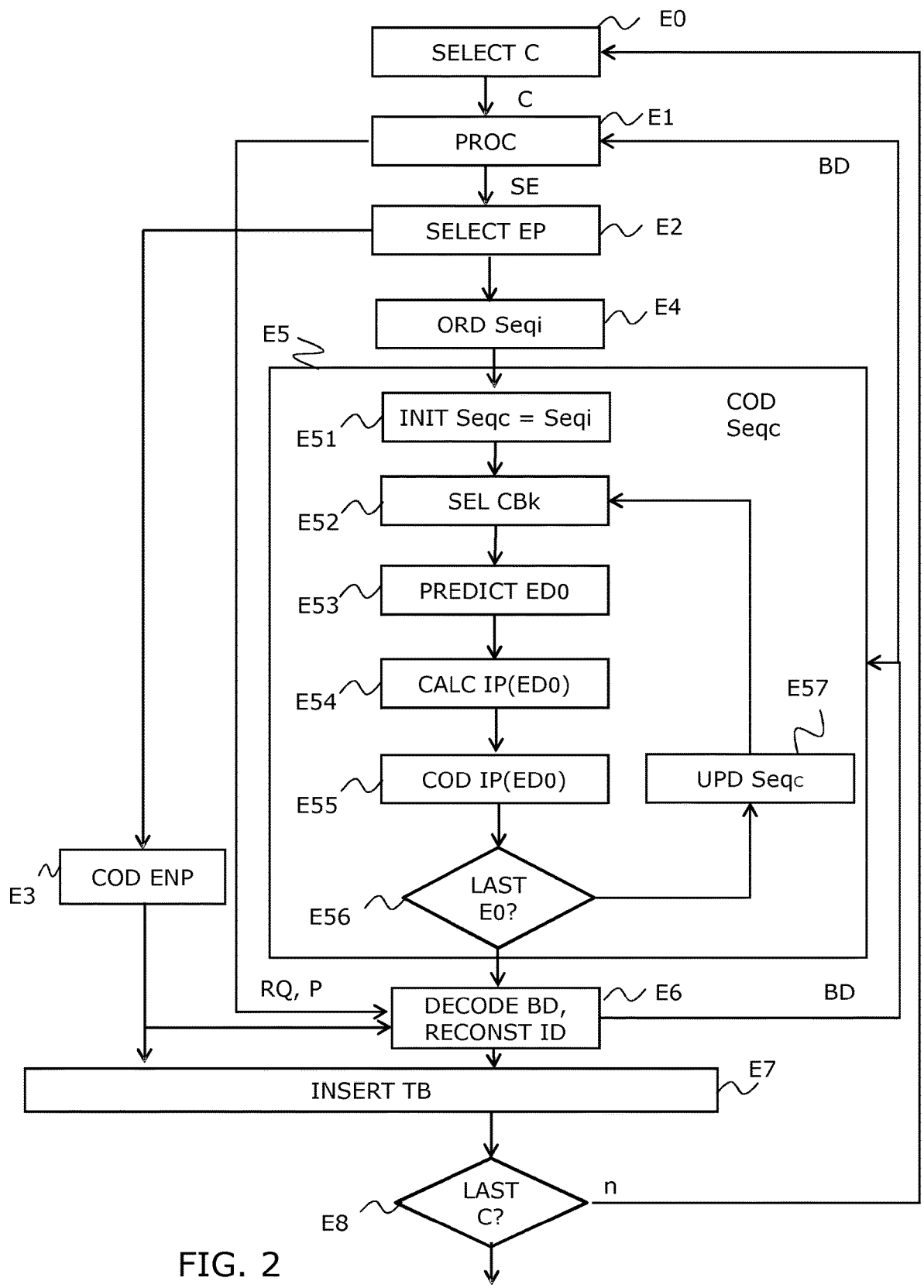

In relation with FIG. 2, during a step E2, a subset SE of this set, comprising the description elements to be predicted, is selected. EP for Block C.

For example, a predetermined number of elements to be predicted is selected according to their amplitude and the size of the current block.

In the embodiment of the invention which will now be detailed, we consider description elements of a particular type, e.g. signs of transformed and quantised coefficients of the current RQ block. Of course, the invention is not limited to this type of element and applies to any other description element of the current block. Other examples will be presented below.

In a first substep E2, an initial subset of descriptive elements to predict SEI is first defined. For example, these are all the signs of the non-zero quantized transformed residue coefficients RQ[i] of the current block.

Advantageously, the knowledge of a context $Cx_j$ associated with each coefficient is exploited among a J plurality of predetermined settings, with J a non-zero integer and j an integer comprised between 1 and J. Such a context is defined by at least one characteristic of the coefficient or block from which it is derived.

Advantageously, the following features are considered:
  the size of the quantized residue block RQ,
  the amplitude of the quantized coefficient RQ[i],
  the frequency coefficient or index i in the block RQ,
  the prediction mode of the current block Mk among K possible modes.

Indeed, the prediction of the sign is all the more reliable as the amplitude is high. Similarly, it has been found that when the block is larger, the frequency of the coefficient is lower, the prediction is more reliable. Finally, it has been found that prediction is more reliable when the current block is associated with an intra-prediction of a certain type.

Alternatively, other contexts can be envisaged. Thus, it is possible to take account of the type of image in which the current block, for example of the Intra or Inter type, known from the HEVC standard, is based on the energy of the predictor P, or as a function of the total number of non-zero coefficients in the current block.

Then we select the signs of the coefficients of the block RQ of the initial set, according to a predetermined score $S_j$, for the context $Cx_j$ associated with the coefficient RQ[i] considered. Such a score Sj is representative of a level of reliability of the sign of the coefficient RQ[i].

For example, the score $S_j$ takes values in a predetermined set, for example from 0 to 10.

According to an embodiment variation, the score is a simple binary indication, one of the two values of which indicates that the sign can be predicted, and the other that the sign cannot be predicted.

According to another embodiment of the invention, the scores $S_j$ correspond to probabilities known a priori, dependent on the context Cxj associated with the coefficient RQ[i]. A set of probabilities of correct detection of the signs of the coefficients RQ are provided in the encoder. For example, this set of probabilities is stored in memory.

These probabilities are constructed, before encoding and decoding, either by statistical accumulation on a set of signals representative of the signals to be encoded, or by mathematical calculation based on hypotheses on the distribution of the signs of the coefficients. For a coefficient RQ[i] associated with the context Cxj, one can thus obtain the score Sj[i] by calculating the correct probability p[1][mk][i][IRQ[i]l] of prediction of the sign of the coefficient RQ[i].

Advantageously, the signs to be predicted are selected by thresholding the scores with which they are associated. Thus, for each coefficient RQ[i] which has a sign (that is to say, which is not zero) and which is associated with a context $Cx_j$ of score $S_j$, the sign is predicted if and only if $S_j$>Th, where Th is a predetermined threshold, for example equal to 0.7. For example, the threshold Th is known to the encoder and the decoder.

According to an embodiment variation, the threshold Th can be chosen during encoding and written in the compressed file or in the bitstream comprising the encoded data representative of the digital image Im. For example, if the unit which performs the encoding does not have enough computing resources at a given time, it is possible to increase this threshold Th in order to predict fewer signs and thus to implement fewer calculations.

It would also be possible to vary the threshold Th as a function of the content of the images to be encoded: an image with a lot of content such as high luminosity variations or many movements would use a high threshold and an image with little content such as low luminosity variations or few movements would use a lower Th threshold, to smooth the complexity or memory required to encode each image.

At the end of this selection, the signs of the selected coefficients RQ[i] are all associated with a context $Cx_j$ and a score $S_j$ greater than the predetermined threshold Th and form a set SE of description elements EP to be predicted.

During a step E3, the description elements ENP that do not belong to the selected subset SE are encoded conventionally. This step implements encoding techniques known to those skilled in the art. For the signs of the coefficients RQ[i] for example, it is known especially from the HEVC standard, particularly the article by Sole et al., already mentioned, the fact of transmitting each character as a bit 0 or 1, with a convention whereby one is associated with the plus sign and the other to the minus sign.

In E 4, the description elements EP are ordered. This order can be predefined, and for example correspond to the scanning order of the signs as defined in the HEVC standard. Preferably, they are ordered according to their associated score. For example, if the score used is representative of a probability of correct prediction, the elements are ordered by decreasing score. We obtain a sequence $Seq_i$, so called initial sequence, of description elements to be predicted. Suppose that we have at this stage M ordered signs to be predicted $Seq_i = \{EP_0 = s_0, EP_1 = s_1, \ldots, EP_{M-1} = s_{M-1}\}$.

In E 5, the description elements of the ordered sequence $Seq_i$ are encoded.

According to a first embodiment of the invention, this step T5 comprises the following substeps:

In E5$_1$ we consider a current sequence $Seq_c$ which is initialised to the initial sequence Seqi.

The following steps form an iterative loop that will be repeated several times, depending on the number M of description elements to be predicted selected in the sequence $Seq_c$.

A description element is likely to take at least two values. For example, a sign may be + or −.

During the step E5$_2$, the different possibilities or hypotheses of combinations of values of the sequence $Seq_c$ of elements to be predicted are evaluated, using an evaluation function FE or a criterion of predetermined cost. We suppose that we have K hypotheses or possible combinations, with K a non-zero integer. In the case where the description elements to predict are the M symbols of a sequence, a sign can take the value + or value −, the number of possible combinations is $K = 2^M$.

For example, for a given assumption this function generates a cost, for example:

$$FE(\{s0 = -, s1 = +, s2 = -, s3 = -, \ldots, sM-1 = +\}) = CT = 4240$$

Here, the assumption is $\{-, +, -, -, \ldots, +\}$ and the resulting cost is 4240. Of course, the evaluation function must make sure to generate a minimal cost when the sign assumption is the most likely. There are several cost functions known from the state of the art and presented in the article by Koyama et al, quoted earlier.

Advantageously, an evaluation function is used which consists in measuring the distortion along left borders FG and upper FS of the current block with previously processed blocks. In connection with FIG. 4, there is shown a decoded image ID and a virtual decoded block DVs of size N×N pixels of the image with the assumed combination of signs whose cost is to be measured, where DVs(lin,col) is the value of the pixel of the block DVs located on the row lin and the column col of the block.

We consider an operator "Side Matching" SM($\Im$,C)), with $\Im$ a current image and C a current block, defined as follows:

$$SM(\Im, C) = \sum_{a=0}^{N-1} (C(0, a) - \Im(lin-1, col+a))^2 + \sum_{a=0}^{N-1} (C(a, 0) - \Im(lin+a, col-1))^2$$

with C (i, j) the value of the coefficients in the virtual decoded block DVs, with i, j integers between 0 and N−1.

In FIG. 4, we have represented along the left border FG the pixels whose values are from bottom to top $y_1$ to $y_4$ and the pixels located along the upper boundary FS of the virtual decoded block DVs whose values are from left to right $y_4$ to $y_7$, as well as pixels $x_1$ to $x_4$ and $x_4$ to $x_8$ respectively located on the other side of the borders FG and FS.

Applying this operator amounts to forming the sum $(x_1-y_1)^2+(x_2-y_2)^2+(x_3-y_3)^2+(x_4-y_4)^2+(x_5-y_4)^2+(x_6-y_5)^2+(x_7-y_6)^2+(x_8-y_7)^2$.

We will determine the best virtual decoded block DVopt that minimises this measure:

$$DV_{opt}=\mathrm{argmin}_{DV_s}SM(ID,DV_s)$$

where ID represents the reconstructed image after decoding.

Alternatively, the likelihood criterion used consists in minimising the error with the predictor P, i.e. in selecting the virtual decoded block which minimises the error with the predictor P.

The virtual residue associated with the optimal virtual decoded block is thus identified.

Of course, other cost criteria could be used, such as, for example, a criterion for minimising a distance/proximity measurement to a predetermined value, for example a mean value or minimising the energy of the residue block.

To generate a decoded current block corresponding to an assumption of signs $Cb_k$, the procedure is as follows:

each coefficient of the current residue block is assigned its actual sign (if it is a coefficient whose sign is not predicted), or the assumed sign (if it is a coefficient whose sign is to be predicted).

using conventional dequantization and inverse transform means, we obtain a decoded residue block, of which the samples $\{r1, r2, \ldots, r7\}$ neighbouring the previously decoded block are added to corresponding elements of the predicted block P to form the reconstructed elements y1=r1+p1, y2=p2+r2, y7=p7+r7 of the virtual decoded block DV, as shown in FIG. 4.

The virtual decoded block obtained DV is used to calculate the cost $CT_k$ associated with the combination $CB_k$ assessed.

Below, we consider that the initial sequence $Seq_i=\{s_0, s_1, s_2\}$ has 3 signs to be predicted. It is assumed that the actual values of the initial sequence are $s_0$=−, $s_1$=+ and $s_2$=−.

The costs $CT_k$ of the following 8 combinations are assessed:
$CT_0$=FE($\{+,+,+\}$)
CT1=FE($\{+,+,-\}$)
CT2=FE($\{+,-,+\}$)
CT3=FE($\{+,-,-\}$)
CT4=FE($\{-,+,+\}$)
CT5=FE($\{-,+,-\}$)
CT6=FE($\{-,-,+\}$)
CT7=FE($\{-,-,-\}$)

The combination associated with the minimum cost is identified. Let us assume that it is $CT_2$.

During a step $E5_3$, the first element of the current sequence Seqc is predicted by the value it takes in the combination $Ck_2$. In this example, this value is +.

In $E5_4$, the corresponding IP prediction indicator is calculated. To do this, we compare the predicted value of s0 with its actual value. The IP indicator indicates whether the predicted sign is equal to or different from the actual sign. For example, it is 0 if the predicted and actual signs are equal, 1 otherwise. In this case, the predicted value is a +, the actual value a −, so the IP indicator of the first sign ED0 is set to 1.

The IP indicator obtained is encoded in $E5_5$. For example, a known entropy encoding technique is used, such as, for example, a Huffman encoding, arithmetic encoding or CABAC encoding used in the HEVC standard. The result is an encoded value of the prediction indicator.

According to the invention, since only the signs that are associated with a score representative of a sufficient level of reliability are predicted, the prediction indicator is set to 1 more often than to the value 0. This is exploited by entropic encoding to reduce the size of the compressed signal.

Advantageously, the entropic encoding takes into account the score Sj associated with the sign predicted to encode the indicator IP. For example, in the embodiment of the invention in which the score has a value between 0 (low reliability of the prediction) and 10 (high reliability of the prediction), the entropic encoding of the indicators is set while taking into account the score, in order to exploit the more or less uniform distribution of indicators. For example, we use a CABAC-type entropic coding, known from the HEVC standard, by initialising the probabilities used in CABAC based on predetermined scores.

In $E5_6$, it is tested whether the first sign $ED_0$ is the last of the sequence. If this is the case, the processing of step E5 is finite because the sequence comprises only one element. Otherwise, the current sequence $Seq_c$ is updated in $E5_7$, by deleting the first element $ED_0$ which has just been processed. The second element $ED_1$ of the initial sequence thus becomes primary and the first iteration is completed.

During the second iteration, the element $ED_1$, which has become first of the current sequence, is processed. Steps $E5_2$ to $E5_6$ are repeated as follows:

At this stage two embodiments of step $E5_2$ are envisaged:

According to a first option, the combinations calculated for the initial sequence, already exploited for the first iteration are reused. It is therefore assumed that they have been recorded in a memory. Among the K combinations of the first iteration, we eliminate those for which so does not have its actual value. We keep only the 4 combinations CT4 to CT7 for which $s_0$ is − and their associated costs:
$CT_4$=FE($\{-,+,+\}$)
$CT_5$=FE($\{-,+,-\}$)
$CT_6$=FE($\{-,-,+\}$)
$CT_7$=FE($\{-,-,-\}$)

Again we identify the one that gets the minimum cost. For example, it is assumed that it is Cb6 with the cost $CT_6$.

According to a second option, the costs associated with combinations of the new current sequence are recalculated. The current sequence $Seq_c$ comprises M=2 elements. There are K=$2^2$ possible combinations. The four possible combinations are assessed using an evaluation function that may be different from that implemented at the first iteration. For example, we use a measure of the energy of the coefficients of the decoded virtual residue block DVs and we choose the combination that minimises this measurement. This evaluation function is more precise, but also more complex to calculate and therefore better suited to shorter sequences.

It is understood that the combinations and costs calculated for a previous iteration are not retained for the next iteration.

In $E5_3$, the sign $s_1$ is predicted to correspond to its value in the selected combination.

In $E5_4$, the corresponding IP prediction indicator is calculated. Since the actual value of s is equal to +, the IP indicator is 1.

In $E5_5$, the IP prediction indicator obtained for $s_1$ is encoded;

In $E5_6$, it is tested whether the first sign $s_1$ is the last of the current sequence.

This is not the case, so we update the current sequence by deleting $s_1$. The new current sequence only includes the sign $s_2$.

The third and last iteration is performed in a similar manner.

In $E5_2$, knowing that $s_0$ is − and $s_1$ is +, the combinations of possible values remaining are $CT_4$ and $CT_5$. It is assumed that the minimum cost is $CT_5$. We therefore choose the combination $Cb_4$.

In $E5_3$, we predict $s_3$ for the value it takes in the combination $Cb_4$, namely +.

In $E5_4$, the corresponding IP prediction indicator is calculated. Since the actual value of $s_2$ is equal to +, the IP indicator indicates a correct prediction and is equal to 0.

In $E5_5$, the calculated prediction indicator is encoded.

In $E5_6$, we test if there are description elements to be processed in the sequence. s2 being the last, the processing of the encoding step E5 is completed.

In the embodiment that has just been presented, the iterations of the step E5 apply to the first element of the sequence, which is updated by deleting the first element once processed. This embodiment has the advantage of reducing, at each iteration, the length of the current sequence to be processed.

Nevertheless, the invention is not limited to this choice of implementation. Alternatively, the initial sequence can be preserved and the index of the current element can be incremented with each new iteration of step E5. In this case, the option of previously calculating the costs associated with all possible combinations of values of the initial sequence and to store them, is the most suitable.

In E6, the decoded block is constructed by applying to the quantised residue RQ the dequantization and inverse transform steps (known per se). The result is a decoded residue block RD. The block predictor P is added to RD to obtain the decoded block BD. During this step, the decoded block D is also added to the reconstructed image ID. This allows to have a decoded version of the current image in the encoder. This decoded version is used in particular during the step of constructing a prediction of the selected symbols to be predicted.

Proceeding to the insertion step E7 in the bitstream TB or in a compressed file of the encoded data representative of the IP prediction indicators and the unpredicted description elements for the current block C.

During a step E8, we test whether the current block C is the last block to be processed by the encoding unit, given the route order previously defined. If so, the encoding unit has completed its processing. If not, the next step is the step E0 of selecting the next block.

In another embodiment, description elements are selected to predict a type other than the signs. In particular, the description element M indicative of the INTRA/INTER prediction mode is considered (in the HEVC standard, such a description element bears the name "pred_mode_flag"), the description element A indicative of the amplitude of the first quantized residue coefficient for the current block (in the HEVC standard, such a description element is designated "coeff_abs_level_remaining") and the description element T indicates the use or not of an inverse transform (in the HEVC standard, such a description element is designated "transform_skip_flag").

In the HEVC standard, for example, an element M can take a value between 0 and 34. An element A can take values between 0 and $2^{16}-1$.

For the current block, the starting set consists of the description elements {M, A, T}. It is considered in this example that, for the current block C, and depending on the contextual information, it is found in step E2 that the score of T is less than the necessary threshold Th, while M and A have a higher score. The subset SE is therefore {M, A}.

The bitstream TB is intended to be presented at the input of a local or remote decoder. For example, a signal carrying the bitstream is transmitted to the decoder via a communication network.

Figure 5:
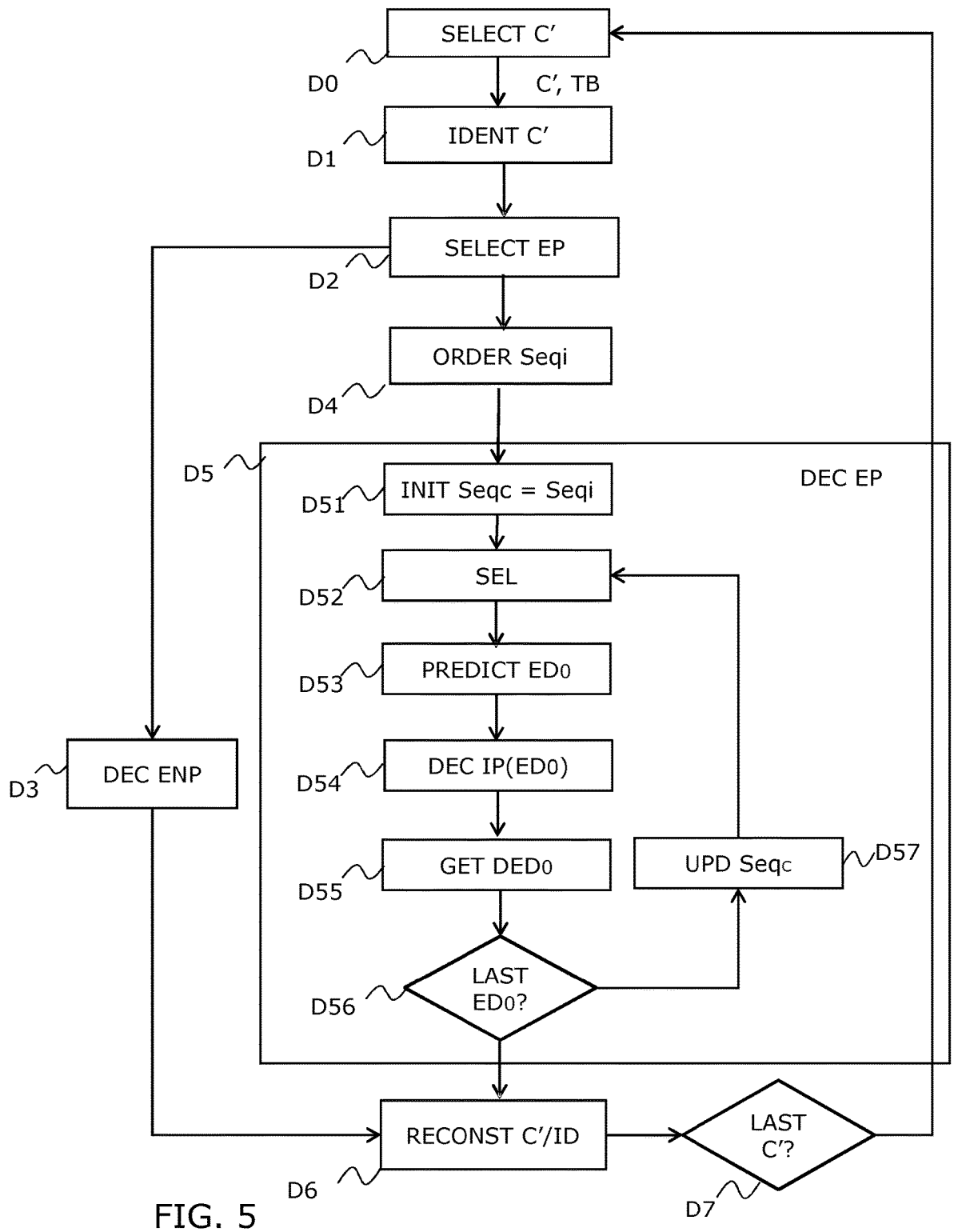
FIG. 5 shows schematically the steps of the decoding method of a digital image according to a first embodiment of the invention.

In relation to FIG. 5, the steps of the method for decoding an encoded digital image according to an exemplary embodiment of the invention are now illustrated. It is assumed that the bitstream TB was received by a decoding device implementing the decoding method according to the invention. In a variation, the decoding device obtains a compressed file FC.

In D0, the first block to be processed is selected as the current block C'. For example, this is the first block (in lexicographic order). This block comprises N×N pixels.

In D1, the current block C' is processed by implementing the decoding scheme, corresponding to the encoding scheme used by the encoder, for example as specified in the HEVC standard. In particular, during this step, it identifies a set of description elements of data ED to be decoded for the current block C'.

In addition, a prediction P' of the block to be decoded C' is provided. The prediction information related to P' are encoded in the bitstream or the compressed file and are decoded. Thus, the prediction mode information is decoded.

The amplitude information of the residue to be decoded RQ' is also decoded into the bitstream or compressed file and is decoded. We now know the amplitudes of RQ'[i], but the signs not yet.

In D2, the method of decoding according to the invention implements the step of selecting the description elements to be predicted among the determined description elements. This step has already been described in detail for the method of encoding in relation to FIGS. 2 and 3. The description elements to be predicted are advantageously selected according to predetermined scores. An SE set is obtained.

At the end of this step, we know the decoded values of the description elements of the block that have not been predicted because they were associated with a score Sj less than a predetermined Th threshold.

During a step D3, the method reads in the bitstream TB the encoded data relating to the description elements of the unpredicted current block and decodes them.

In D4, it orders the elements of the set SE obtained in an initial sequence $Seq_i$, by decreasing scores, as already described for the method of encoding according to the invention.

The step D5 of decoding description elements to be predicted will now be detailed in a particular embodiment. Note that it is very similar to the step $E_5$ implemented by the method of encoding according to the invention which has just been described.

In $D5_1$ we consider a current sequence $Seq_c$ that is initialised at the initial sequence Seqi.

The following steps ($D5_2$ to $D5_6$) form an iterative loop that will be repeated several times, depending on the number M of description elements to be predicted selected in the sequence $Seq_c$.

In $D5_2$, the best combination is selected in the sense of an evaluation function FE, the same as that used by the encoding method which generated the bitstream to be decoded, among the possible combinations of values of the current sequence $Seq_c$. As already mentioned for the encoding method, there are several possible evaluation functions. In the following, we consider a distortion reading along a border with previously processed blocks and the combination of values that minimises this reading is selected.

During a first iteration, the first description element of the sequence $Seq_c$ is decoded. In the following, it is assumed that the description elements are signs.

Using the cost function, the costs corresponding to each possible assumption or combination are generated for all the signs to be predicted. So, let us assume that M=3, and $Seq_c=\{s_0, s_1, s_2\}$. The following costs will be generated:

$CT_0=FE(\{+,+,+\})$
$CT_1=FE(\{+,+,-\})$
$CT_2=FE(\{+,-,+\})$
$CT_3=FE(\{+,-,-\})$
$CT_4=FE(\{-,+,+\})$
$CT_5=FE(\{-,+,-\})$
$CT_6=FE(\{-,-,+\})$
$CT_7=FE(\{-,-,-\})$

These are the 8 costs corresponding to the 8 possible assumptions regarding the signs to be predicted. It is assumed that the minimum cost is $CT_2$.

In $D5_3$, the value of the first sign s0 is predicted by its value in the combination $C_{b2}$. This is a +.

In $D5_4$, the prediction indicator IP corresponding to this first sign s0 is decoded from encoded data extracted from the bitstream or compressed file. This indicator shows whether the predicted sign has been correctly predicted or not. For example, we assume that the decoded value is 1 and it is associated with an incorrect prediction.

In $D5_5$, we deduce that the decoded value of the sign s0 is a –.

In $D5_6$, it is tested whether the first sign $ED_0$ is the last of the current sequence. If this is the case, the processing ends. Otherwise, the current sequence is updated in $D5_7$, by deleting the first element $ED_0$=s0 which has just been processed.

During the second iteration, the second element $s_2$, which has become first of the current sequence, is processed.

In $D5_2$, we consider the combinations $Cb_k$, for which the value $s_0$ is decoded, the others being eliminated.

In the example considered, the actual value of $s_0$ is –, and the following costs are therefore compared:

$CT_4=FE(\{-,+,+\})$
$CT_5=FE(\{-,+,-\})$
$CT_6=FE(\{-,-,+\})$
$CT_7=FE(\{ \})$

These 4 costs corresponds to the 4 possible assumptions on the signs that remain to be predicted, knowing the decoded value of that which has already been processed.

$CT_6$ is identified as the minimum cost.

In $D5_3$, $s_1$ is predicted by its value in the combination $Cb_6$, that is to say a –.

In $D5_4$, the IP indicator corresponding to this first sign D2 is decoded from encoded data extracted from the bitstream or compressed file. An indicator is decoded, which designates whether the predicted sign is equal to or different from the actual sign. In our example, let us assume that the decoded value of IP is 0, which means that the prediction of this sign is correct.

In $D5_5$, we deduce that s1 is –.

In $D5_6$, we test whether s1 is the last element. Since this is not the case, we update the current sequence in $D5_7$, by deleting s1. The new sequence $Seq_c$ is reduced to the element $s_2$.

During a third and last iteration, the last sign $s_2$ is decoded.

In $D5_2$, we consider the combinations of values of the initial sequence $Seq_i$ for which the already processed description elements s0 and s1 take their decoded value.

The following costs are therefore compared:

$CT_6=FE(\{-,-,+\})$
$CT_7=FE(\{-,-,-\})$ $CT_6$ is identified as the minimum cost.

Then, the last sign $s_2$ in the predefined order is predicted, in $D5_3$, by its value in the combination $Cb_6$: it is a +.

Then, an IP indicator associated with the sign $s_2$ is decoded at $D5_4$. It indicates whether the sign $s_2$ has been correctly predicted or not. In our example, let us assume that the decoded value is 0, which means that the prediction of this sign is correct.

In $D5_5$, we deduce that the decoded value of the $s_2$ is the sign +.

In $D5_6$, we see that $s_2$ is the last element to be processed.

As for the encoding, it will be noted that the invention is not limited to the embodiment that has just been presented. Other implementation choices can be made, such as the one to keep the sequence at its original length, to update the index of the current element, initialised to the first description element $ED_0$ and to terminate the iterations once the last $ED_{M-1}$ element processed.

Proceeding onwards to step D6 of reconstructing the current block C' from the decoded description elements, EP predicted ($D_5$) and ENP not predicted (D3), amplitude information of residue block coefficients RQ' and prediction P' obtained in $D_1$.

To do this, we first dequantize the block RQ' to obtain a dequantized block. This is achieved by means appropriate to the quantification used during encoding (scalar dequantization, vector dequantization . . . ) known to the man of the art.

Then, an inverse transform from that used in encoding is applied to the dequantized residue. The decoded residue is then obtained.

Finally, the decoded block BD' is reconstructed by adding the decoded residue to the prediction P'.

This block is integrated with the image being decoded.

During a step D7, we test whether the current block is the last block to be processed, given the scanning order previously defined. If yes, the decoding is complete. If not, the next step is the step Do of selecting the next loop and the steps of the method of decoding are repeated.

According to the invention, since all the elements of the initial sequence selected according to the predetermined scores are predicted, it is therefore known as soon as the outcome of step D2 how many IP prediction indicators are to be extracted from the bitstream or the compressed file. It is understood that this makes it possible to carry out an implementation of the invention which decorrelates the reading and parsing operations of the encoded data contained in the bitstream or compressed file of the processing operations of the current block according to the encoding/decoding scheme implemented. For example, the decoding could be organised using a specific component for parsing/reading encoded data in the bitstream and another for the reconstruction operations of the decoded blocks. An advantage of this independent parsing process is to enable parallelisation of the decoding operations.

It will be noted that the invention just described, can be implemented using software and/or hardware components. In this context, the terms "module" and "entity" used in this document, can be either a software component or a hardware component or even a set of hardware and/or software components, capable of implementing the function(s) outlined for the module or entity concerned.

Figure 6:
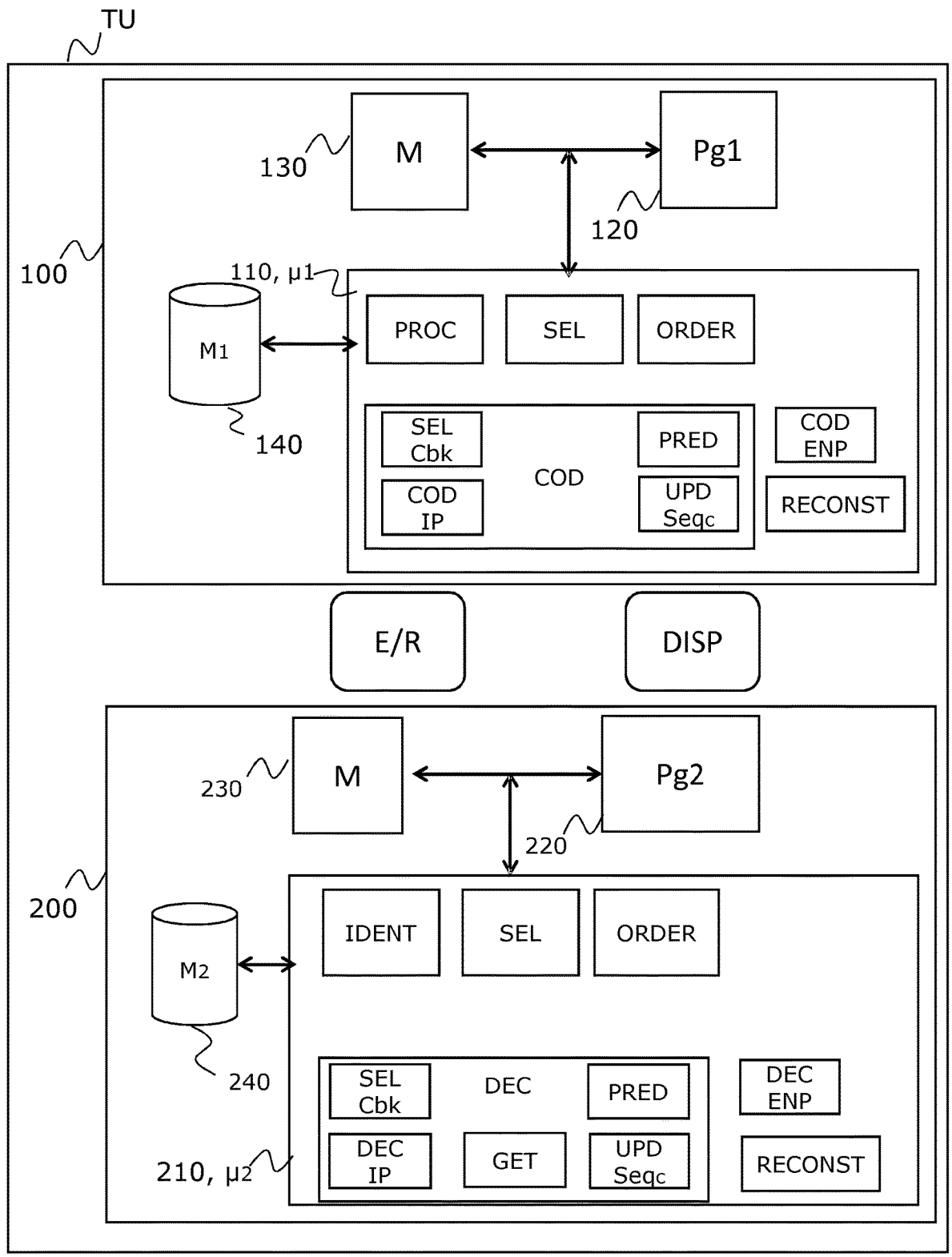
FIG. 6 shows an example of a simplified structure of a device for encoding a digital image and a device for decoding a digital image according to one embodiment of the invention.

In relation to FIG. 6, we now present an example of simplified structure of a device 100 for encoding a digital image and a device 200 for decoding a bitstream according to the invention. The device 100 implements the method of encoding according to the invention which has just been described in connection with FIG. 2. Only the main elements relating to the implementation of the technique according to the invention are illustrated.

For example, the device 100 comprises a processing unit 110, equipped with a processor $\mu_1$ and driven by a computer program $Pg_1$ 120, stored in a memory 130 and implementing the method of encoding according to the invention.

At initialisation, the code instructions of the computer program $Pg_1$ 120 are for example loaded into a RAM before being executed by the processor of the processing unit 110. The processor of the processing unit 110 implements the steps of the method described above, according to the instructions of the computer program 120.

In this embodiment of the invention, the processor 110 is able to and configured for:
  processing (PROC) a current block and obtain a set of description elements of this block;
  selecting (SEL) a subset of description elements to predict from a set of description elements of the block as a function of scores associated with said elements;
  ordering (ORDER) the description elements of the subset in a sequence, so-called initial sequence, according to said scores;
  encoding (COD) the elements of the ordered sequence.

The device 100 is further configured to encode the non-predicted elements (ENC ENP) and to reconstruct the decoded block BD and the decoded image (RECONST).

According to the invention, the encoding of the elements of the initial sequence comprises at least two iterations of the following units, configured and able to be applied to a sequence, so-called current sequence, initialised at the initial sequence:
  selecting (SEL $C_{bk}$) a combination of predicted values of the description elements of the current sequence among a plurality of possible combinations based on a predetermined cost criterion and from the second element, based on values of description elements previously processed of the initial sequence;
  predicting (PRED) the first element of the sequence by its value in the selected combination;
  encoding (COD IP) an indicator representative of a difference between the value of the current element and the predicted value, and
  updating (UPD $Seq_c$) the current sequence by deleting the first element.

According to one embodiment of the invention, the device 100 furthermore comprises a unit $M_1$ for storing the encoding contexts of the coefficients, predetermined scores associated with each of these contexts, predicted values for the selected description elements, and the plurality of combinations of values of the selected sequence of description elements to be predicted.

These units are controlled by the processor $\mu 1$ of the processing unit 110.

Advantageously, such a device 100 can be integrated with a user terminal equipment TU, such as an encoder, a personal computer, a tablet, a digital camera, a smart phone, etc. The device 100 is then arranged to cooperate at least with the next module of the terminal TU:
  a E/R module for sending and receiving data via which the bitstream TB or the compressed file FC is transmitted in a telecommunications network, for example a wired, radio or Hertzian network.

The decoding device 200 implements the method of decoding according to the invention which has just been described in connection with FIG. 5.

For example, the device 200 comprises a processing unit 210, equipped with a processor $\mu_2$ and driven by a computer program $Pg_2$ 220, stored in a memory 230 and implementing the method according to the invention.

At initialisation, the code instructions of the computer program $Pg_2$ 220 are for example loaded into a RAM before being executed by the processor of the processing unit 210. The processor of the processing unit 210 implements the steps of the method described above, according to the instructions of the computer program 220. In this embodiment of the invention, the processor 200 is able to and configured for:
  Identifying (IDENT) a set of description elements of the current block from bitstream data;
  Selecting (SEL) a subset of description elements to be predicted in the identified set, as a function of scores associated with said elements;
  Ordering (ORDER) the description elements of the subset in a sequence, so-called initial sequence, according to said scores;
  Decoding (DEC) the elements of the ordered sequence.

According to the invention, the decoding of the elements of the initial sequence comprises at least two iterations of the following units, configured and adapted to be applied to a sequence, so-called current sequence, initialised at the initial sequence:
  Selecting (SEL $C_{bk}$) a combination of predicted values of the description elements of the current sequence from a plurality of possible combinations based on a predetermined cost criterion and values of description elements previously processed of the initial sequence;
  Predicting (PRED) the first element of the sequence by its value in the selected combination;
  Decoding (DEC IP) an indicator representative of a difference between the decoded value of the current element and the predicted value, based on encoded data extracted from the bitstream,
  Obtaining (GET $DED_0$) the decoded value of the current element from the decoded indicator and the predicted value; and
  Updating (UPD Seqc) the current sequence by deleting the first decoded element.

The device 200 is further configured to decode the non-predicted elements (DEC ENP) and to reconstruct the decoded block BD and the decoded image (RECONST).

The device 200 furthermore comprises a unit $M_2$ for storing the encoding contexts of the coefficients, predetermined scores associated with each of these contexts, values predicted for the selected description elements selected for a block C' and combinations $C_{bk}$ of values of the selected description elements of the sequence to be predicted.

These units are controlled by the processor µ2 of the processing unit 210.

Advantageously, such a device 200 can be integrated with a user terminal equipment TU, such as an encoder, a set-top-box, a digital TV set, a personal computer, a tablet, a digital camera, a smart phone, etc. The device 200 is then arranged to cooperate at least with the next module of the terminal TU:
  a E/R module for sending and receiving data via which the bitstream TB or the compressed file FC is received from a telecommunications network;
  a DISP module for displaying decoded digital images.

The invention that has just been presented can find many applications, in particular in the context of video signal compression, audio (speech, sound), still images, images acquired by an imaging module medical. It applies for example to two-dimensional (2D), three-dimensional (3D) contents including a depth map, or multispectral images (whose colour intensities are different from the three red green-blue bands) or finally to full images.

An exemplary embodiment of the invention overcomes the shortcomings of the prior art.

An exemplary embodiment of the invention proposes a solution that more effectively selects the signs to be predicted.

An exemplary embodiment of the invention proposes a solution that is more efficient in compression.

An exemplary embodiment of the invention proposes a solution that applies to any type of description element of a block of pixels used for the encoding of a digital image.

It goes without saying that the embodiments which have been described above have been given by way of purely indicative and non-limiting example, and that many modifications can be easily made by those skilled in the art without departing from the scope of the invention.

The invention claimed is:

1. A method for encoding a digital image, said image being divided into a plurality of blocks of pixels processed in a set order, said method comprising the following acts, implemented by an encoding device for a current block:
    processing the current block to provide a set of description elements of the processed block, each description element having an actual value;
    selecting a subset of at least two description elements to be predicted from the provided set;
    ordering the description elements of the subset into an ordered sequence;
    encoding the elements of the sequence, which comprises scrolling the elements of the sequence and comprises, for each current element of the sequence, the following subacts:
        selecting a combination of predicted values of description elements of the sequence among a plurality of combinations according to a predetermined cost criterion and, from a second iteration of the subacts, the actual values of description elements previously scrolled in the sequence;
        predicting the current element of the sequence by its value in the selected combination; and
        encoding an indicator representative of a difference between the actual value of the current element and its predicted value; and
    performing at least one of transmitting the encoded elements in a bitstream via a communication network or storing the encoded elements in a compressed file on a non-transitory computer-readable medium.

2. The method for encoding a digital image according to claim 1, wherein the ordering generates an initial sequence, the encoding takes as a current element the first element of a current sequence initialised at the initial sequence and comprises, once the first current element has been scrolled, a subact of updating the current sequence by deleting the first element.

3. The method for encoding a digital image according to claim 1, further comprising a preliminary act of calculating costs associated with the plurality of combinations of values of the ordered sequence, an act of storing the plurality of combinations and their associated costs, and wherein the selecting comprises selecting, for the current element, a combination of values of the ordered sequence for which the previously processed elements have their actual values.

4. The method for encoding a digital image according to claim 1, wherein the selecting comprises, for the current element, a subact of calculating costs associated with the possible combinations of values of the current sequence as a function of a cost criterion which depends on the actual values of the elements previously scrolled.

5. The method for encoding a digital image according to claim 1, wherein the selecting a subset of at least two description elements to be predicted comprises selecting a subset of description elements to be predicted based on predetermined scores, a predetermined score being representative of a reliability level of the prediction element with which it is associated and wherein the ordering comprises ordering the elements to be predicted according to said scores.

6. The method for encoding a digital image according to claim 1, wherein the predetermined cost criterion belongs to a group consisting of:
    a criterion for minimising a distortion along a border of the current block with a previously processed block;
    a criterion for minimising a distance measurement to a mean value;
    a criterion for minimising an energy measurement of a difference between the current block and a prediction of the current block.

7. A device for encoding a digital image, said image being divided into a plurality of blocks of pixels processed in a set order, said device comprising:
    a reprogrammable computing machine or a dedicated computing machine, configured to:
    process the current block and provide a set of description elements of the processed block, each description element having an actual value;
    select a subset of at least two description elements to be predicted from the provided set;
    order the description elements of the subset into a ordered sequence;
    encode the elements of the ordered sequence, which comprises scrolling elements of the sequence and, for each current element of the sequence:
        selecting a combination of predicted values of description elements of the sequence among a plurality of combinations according to a predetermined cost criterion and, from a second iteration of the subacts, the actual values of description elements previously scrolled in the sequence;
        predicting the current element of the sequence by its value in the selected combination; and
        encoding an indicator representative of a difference between the actual value of the current element and its predicted value.

8. A method for decoding a digital image from a bitstream, said image being divided into a plurality of blocks processed in a set order, the bitstream comprising encoded data representative of elements description of the blocks of the image, said method comprising the following acts, implemented by a decoding device for a current block:
    receiving the bitstream from a communication network or a compressed file stored on a non-transitory computer-readable medium;
    identifying a set of description elements of the current block from data of the bitstream;
    selecting a subset of at least two description elements to be predicted from the identified set;
    ordering the description elements of the subset into an ordered sequence;

decoding the elements of the ordered sequence, which comprises scrolling said elements and comprises, for each current element of the sequence, the following subacts:
　selecting a combination of predicted values of description elements of the sequence among a plurality of combinations according to a predetermined cost criterion and, from second iteration of the subacts, decoded values of description elements previously scrolled in the sequence;
　predicting the first element of the sequence by its value in the selected combination;
　decoding an indicator representative of a difference between the decoded value of the current element and the predicted value, based on encoded data extracted from the bitstream, and
　obtaining the decoded value of the current element from the decoded indicator and the predicted value.

9. The method of decoding a digital image according to claim 8, wherein the ordering generates an initial sequence, the decoding takes as a current element the first element of a current sequence initialised at the initial sequence and comprises, once the first current element has been processed, a subact of updating the current sequence by deleting the first element.

10. The method of decoding a digital image according to claim 8, further comprising a preliminary act of calculating the costs associated with the plurality of combinations of values of the initial sequence, an act of recording the plurality of combinations and their associated costs and wherein the act of selecting comprises selecting a combination from the recorded combinations that start with the decoded values of the previously scrolled items in the scrolling order.

11. The method of decoding a digital image according to claim 8, wherein the act of selecting comprises, for the current element, calculating the costs associated with the possible combinations of values of the current sequence as a function of a cost criterion which depends on the decoded values of the elements previously scrolled.

12. A device for decoding a digital image from a bitstream, said image being divided into a plurality of blocks processed in a set order, the bitstream comprising encoded data representative of description elements of the blocks of the image, said device comprising:
　a reprogrammable computing machine or a dedicated computing machine, configured to, for a current block:
　　identify a set of description elements of the current block from bitstream data;
　　select a subset of at least two description elements to be predicted from the identified set;
　　order the description elements of the subset into a ordered sequence;
　　decode the elements of the ordered sequence, which comprises scrolling said elements and comprises, for each current element of the sequence, the following subacts:
　　　selecting a combination of predicted values of the description elements of the current sequence among a plurality of possible combinations based on a predetermined cost criterion and from a second iteration of the sequence, values of description elements previously decoded of the initial sequence;
　　　predicting the first element of the sequence by its value in the selected combination;
　　　decoding an indicator representative of a difference between the decoded value of the current element and the predicted value, based on encoded data extracted from the bitstream, and
　　　obtaining the decoded value of the current element from the decoded indicator and the predicted value.

13. A user terminal comprising the device for encoding a digital image according to claim 7.

14. A non-transitory computer-readable medium comprising a computer program stored thereon comprising instructions for implementing a method for encoding a digital image when the instructions are executed by a processor of an encoding device, wherein said image is divided into a plurality of blocks of pixels processed in a set order, and the instructions configure the encoding device to perform the following acts for a current block:
　processing the current block to provide a set of description elements of the processed block, each description element having an actual value;
　selecting a subset of at least two description elements to be predicted from the provided set;
　ordering the description elements of the subset into an ordered sequence;
　encoding the elements of the sequence, which comprises scrolling the elements of the sequence and comprises, for each current element of the sequence, the following subacts:
　　selecting a combination of predicted values of description elements of the sequence among a plurality of combinations according to a predetermined cost criterion and, from a second iteration of the subacts, the actual values of description elements previously scrolled in the sequence;
　　predicting the current element of the sequence by its value in the selected combination; and
　　encoding an indicator representative of a difference between the actual value of the current element and its predicted value; and
　performing at least one of transmitting the encoded elements in a bitstream via a communication network or storing the encoded elements in a compressed file on a non-transitory computer-readable medium.

15. A non-transitory computer-readable medium comprising a computer program stored thereon comprising instructions for implementing a method for decoding a digital image from a bitstream when the instructions are executed by a processor of a decoding device, wherein the image is divided into a plurality of blocks processed in a set order, the bitstream comprises encoded data representative of elements description of the blocks of the image, and the instructions configure the decoding device to implement the following acts for a current block:
　receiving the bitstream from a communication network or a compressed file;
　identifying a set of description elements of the current block from data of the bitstream;
　selecting a subset of at least two description elements to be predicted from the identified set;
　ordering the description elements of the subset into an ordered sequence;
　decoding the elements of the ordered sequence, which comprises scrolling said elements and comprises, for each current element of the sequence, the following subacts:

selecting a combination of predicted values of description elements of the sequence among a plurality of combinations according to a predetermined cost criterion and, from a second iteration of the subacts, decoded values of description elements previously scrolled in the sequence;

predicting the first element of the sequence by its value in the selected combination;

decoding an indicator representative of a difference between the decoded value of the current element and the predicted value, based on encoded data extracted from the bitstream, and obtaining the decoded value of the current element from the decoded indicator and the predicted value.

16. A user terminal comprising the device for decoding a digital image according to claim 12.

* * * * *